(12) United States Patent
Chen

(10) Patent No.: US 8,369,081 B2
(45) Date of Patent: Feb. 5, 2013

(54) MOUNTING MECHANISM FOR HARD DISK DRIVES

(75) Inventor: Xiao-Zhu Chen, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 464 days.

(21) Appl. No.: 12/650,560

(22) Filed: Dec. 31, 2009

(65) Prior Publication Data

US 2011/0103001 A1 May 5, 2011

(30) Foreign Application Priority Data

Oct. 30, 2009 (CN) .......................... 2009 1 0309170

(51) Int. Cl.
*H05K 5/00* (2006.01)
*H05K 7/00* (2006.01)
(52) U.S. Cl. .............. 361/679.39; 312/223.1; 312/223.2
(58) Field of Classification Search ............. 361/679.39; 312/223.1, 223.2
See application file for complete search history.

(56) References Cited

U.S. PATENT DOCUMENTS

| 7,012,808 | B2 * | 3/2006 | Mayer ........................... 361/725 |
| 7,055,701 | B2 * | 6/2006 | Dean et al. ...................... 211/26 |
| 7,123,817 | B2 * | 10/2006 | Ando et al. ..................... 386/264 |
| 2006/0274508 | A1 * | 12/2006 | LaRiviere et al. ............. 361/727 |
| 2008/0117587 | A1 * | 5/2008 | Fan et al. ....................... 361/685 |

* cited by examiner

*Primary Examiner* — Anthony Haughton
(74) *Attorney, Agent, or Firm* — Altis Law Group, Inc.

(57) ABSTRACT

A mounting mechanism for a plurality of hard disk drives is provided. The mounting mechanism includes a chassis, a cage slidably received in the chassis, and two latch members pivotably attached to opposite side plates of cage. Each of the latch members includes a hook. When the latch members are pivoted to locking positions, the hooks of the latch members engage with the chassis to prevent the cage from sliding out of the chassis. When the locking members are pivoted to unlocking positions, the hooks of the latch members disengage from the chassis, therefore, the cage can be withdrawn from the chassis.

3 Claims, 5 Drawing Sheets

MOUNTING MECHANISM FOR HARD DISK DRIVES

BACKGROUND

1. Technical Field

The present disclosure relates to a mounting mechanism for hard disk drives (HDDs).

2. Description of the Related Art

A computer, such as a desktop computer, a tower computer, or a server, and the like, may include a plurality of HDDs. To mount the plurality of HDDs, a cage for receiving the plurality of HDDs is usually secured in an enclosure of the computer by riveting, screwing, or spot welding. HDDs with large form factor (LFF) and HDDs with small form factor (SFF) are commonly used. Since the LFF HDDs and the SFF HDDs have different sizes, it is necessary to alternate two different cages in the enclosure to mount the two different kinds of HDDs. However, the cages secured by means of riveting, screwing, or spot welding are inconvenient for detaching, therefore, a computer can hardly be adapted for differently sized HDDs.

DETAILED DESCRIPTION

Figure 1:
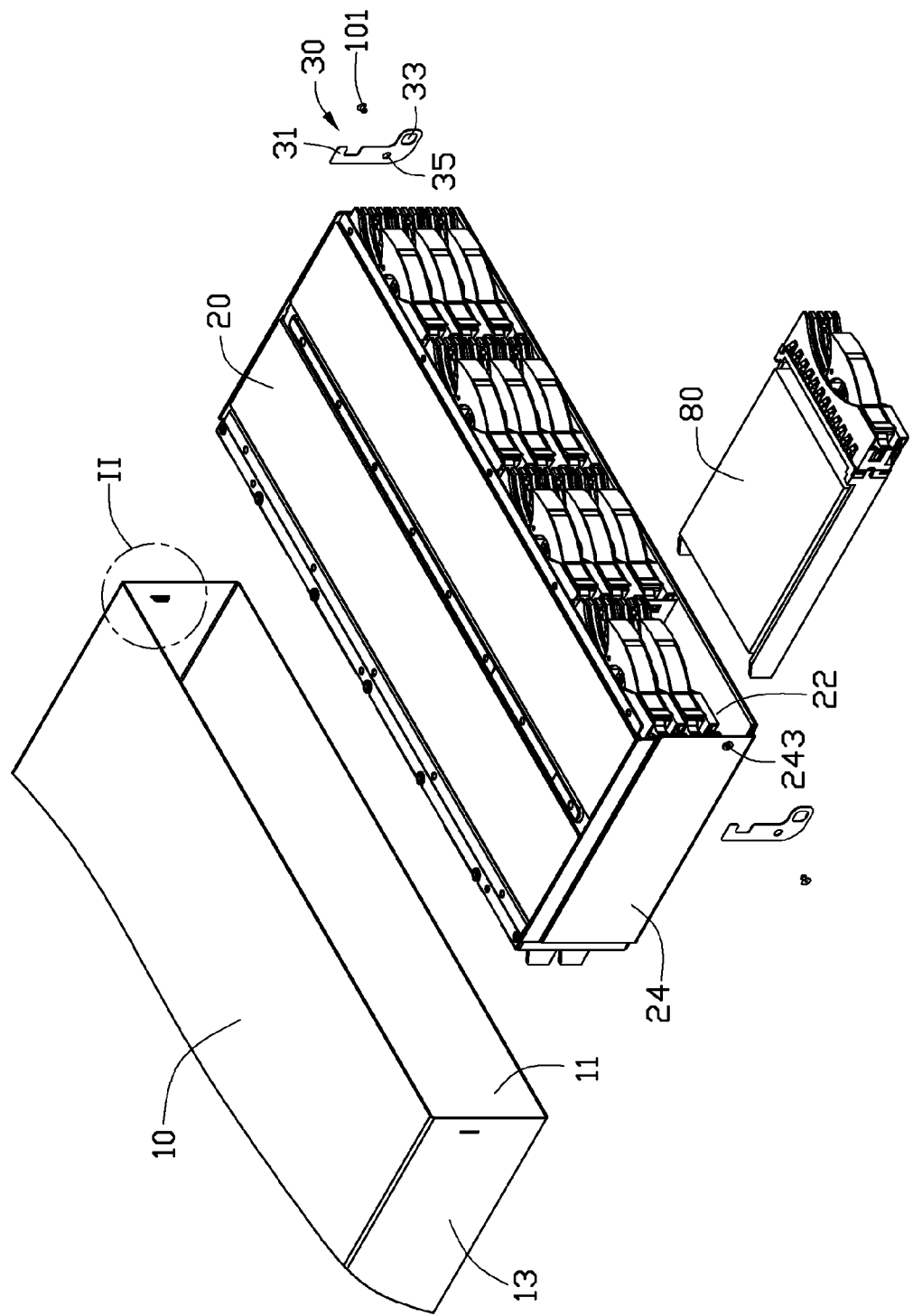
FIG. 1 is an exploded, isometric view of an embodiment of a mounting mechanism and a plurality of hard disk drives (HDDs) having large form factor, the mounting mechanism includes a chassis, a cage, and two latch members.
Figure 2:
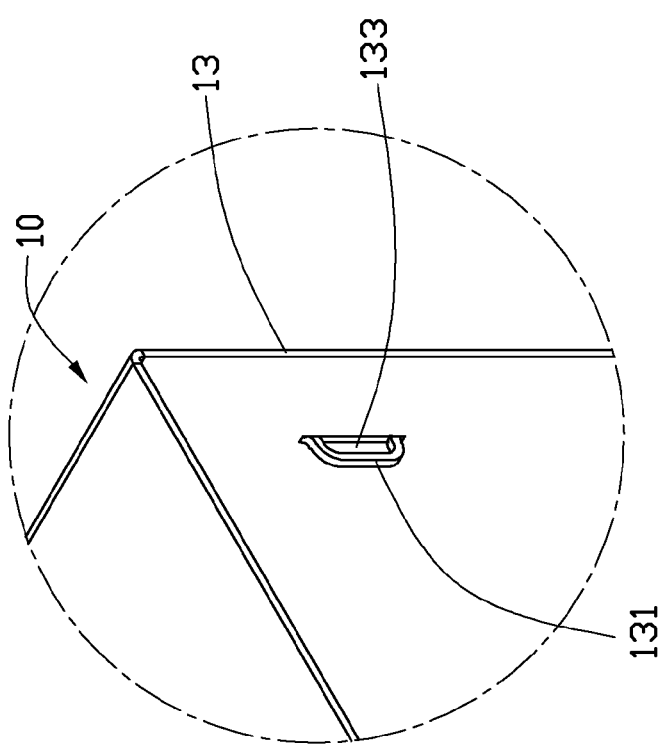
FIG. 2 is an enlarged view of the encircled portion II of FIG. 1.

Referring to FIG. 1, an embodiment of a mounting mechanism includes a chassis 10, a cage 20, and two latch members 30.

Referring to 2, the chassis 10 is substantially rectangular, and defines an opening 11 in an end of the chassis 10, for the cage 20 to enter or exit from the chassis 10. The chassis 10 includes opposite sidewalls 13 bounding the opening 11. An arc-shaped tab 131 extends inwards from each of the sidewalls 13 of the chassis 10, adjacent to the opening 11. A locking hole 133 is defined between each of the sidewalls 13 of the chassis 10 and the tab 131 depending upon the sidewall 13.

The cage 20 is substantially rectangular. In one embodiment, the cage 20 is designed to accommodate a plurality of hard disk drives (HDDs) 80 with large form factor (LFF). The cage 20 defines an opening 22 in an end of the cage 20, for the plurality of HDDs 80 to enter or exit from the cage 20. The cage 20 includes opposite side plates 24 bounding the opening 22, each side plate 24 defining a mounting hole 243 therein adjacent to the opening 22.

Each of the latch members 30 is strip-like and defines a pivot hole 35 in a middle of the latch member 30. A hook 31 and an operating portion 33 are respectively formed at opposite ends of the latch member 30.

Figure 3:
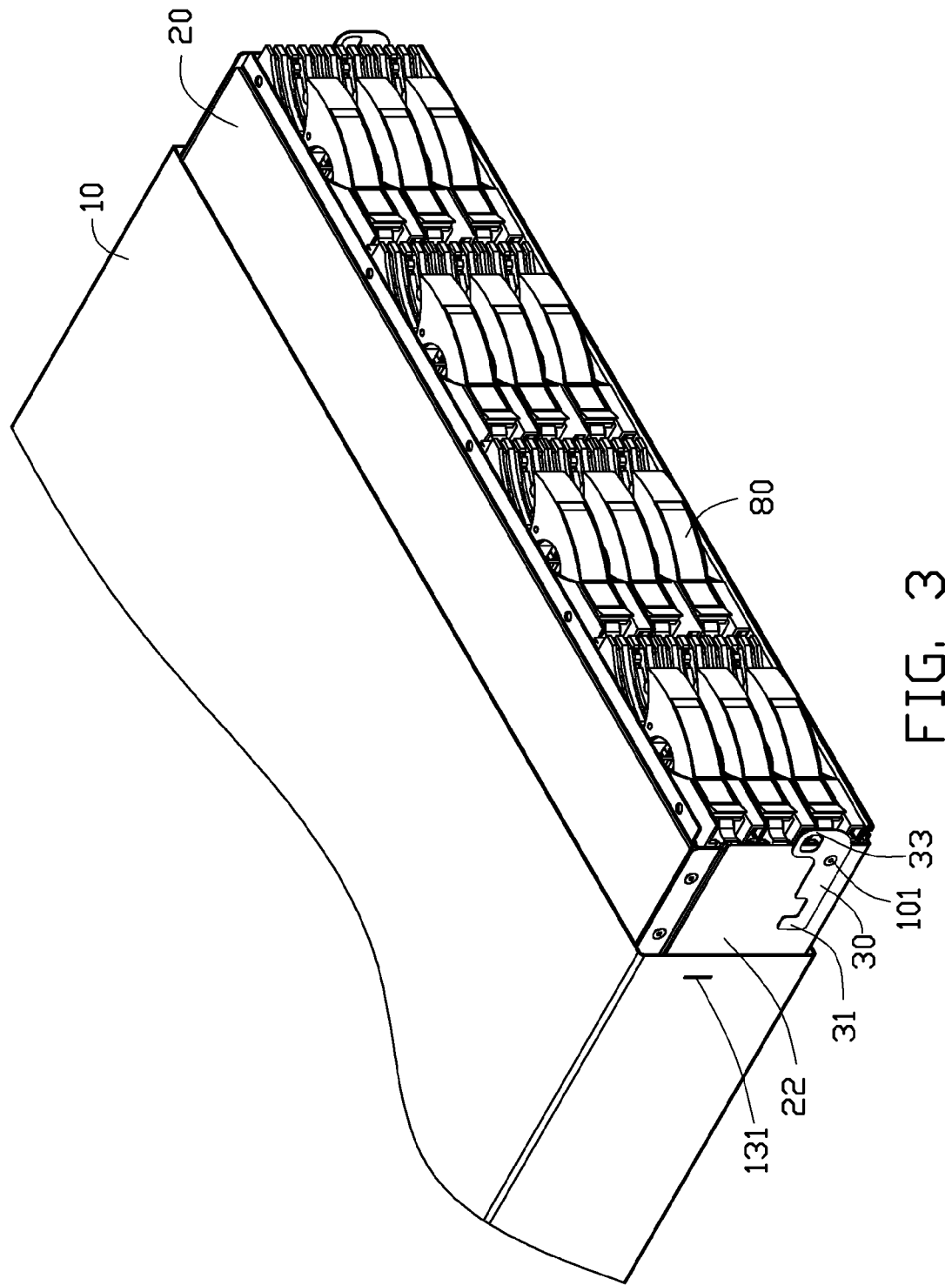
FIG. 3 is a partially assembled view of FIG. 1, showing the cage partially inserted in the chassis 10.
Figure 4:
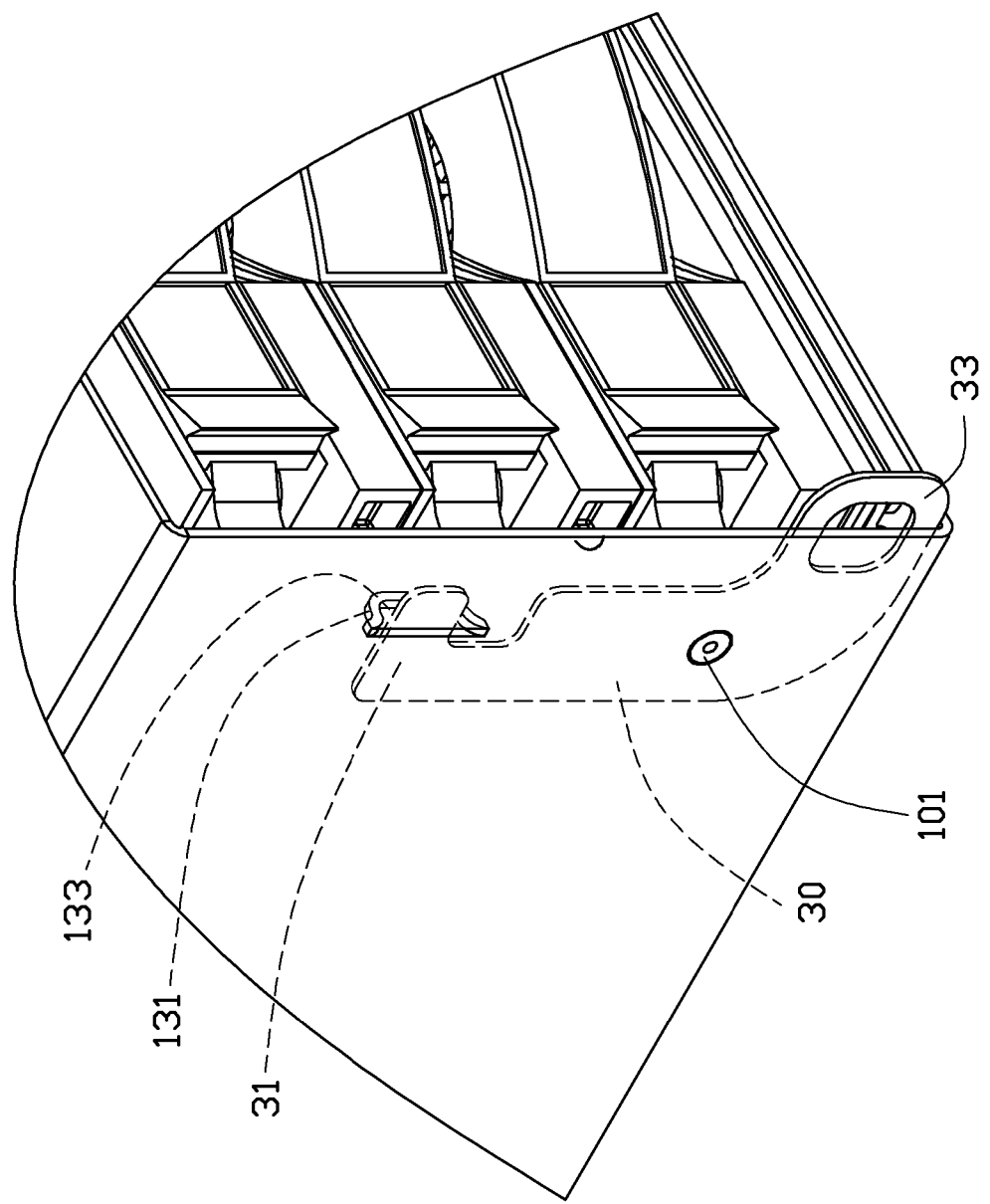
FIG. 4 is an enlarged view of a portion of FIG. 3, but showing one of the latch members in a locking position.

Referring to FIGS. 3 and 4, in assembly, two fasteners 101 correspondingly extend through the pivot holes 35 of the latch members 30, and are fastened in the mounting holes 243 of the side plates 24 of the case 20, to pivotably mount the latch members 30 to the corresponding side plates 24 of the cage 20. The cage 20 slides into the chassis 10 through the opening 11. During the sliding of the cage 20, the latch members 30 are pivoted to unlock positions, at which lengthwise directions of the latch members 30 are substantially parallel to a sliding direction of the cage 20, to avoid the hooks 31 from engaging with the corresponding tabs 131 of the chassis 10, and the operating portions 33 of the latch members 30 extend out of the chassis 10 through the opening 11. When the cage 20 is fully received in the chassis 10, the operating portions 33 of the latch members 30 are driven downwards to pivot the latch members 30 to locking positions, at which, the lengthwise directions of the latch members 30 are substantially perpendicular to the lengthwise directions the latch members 30 at the unlock portions. The hooks 31 of the latch members 30 are engaged in the locking holes 133 of corresponding sidewalls 13 of the chassis 10, and the operating portions 33 of the latch members 30 are partially sandwiched between the sidewalls 13 of the chassis 10 and the corresponding side plates 24 of the cage 20. Therefore, the cage 20 is secured in the chassis 10, ready for accommodating the plurality of HDDs 80, thereby mounting the plurality of HDDs 80 to the chassis 10.

To detach the cage 20 from the chassis 10, the operating portions 33 of the latch members 30 are driven out of the chassis 10 to pivot the latch members 30 to the unlocking portions. Therefore, the hooks 31 of the latch members 30 are disengaged from the corresponding locking holes 133 of the chassis 10, and the cage 20 is ready for being withdrawn from the chassis 10 by manipulating the operating portions 33 of the latch members 30.

Figure 5:
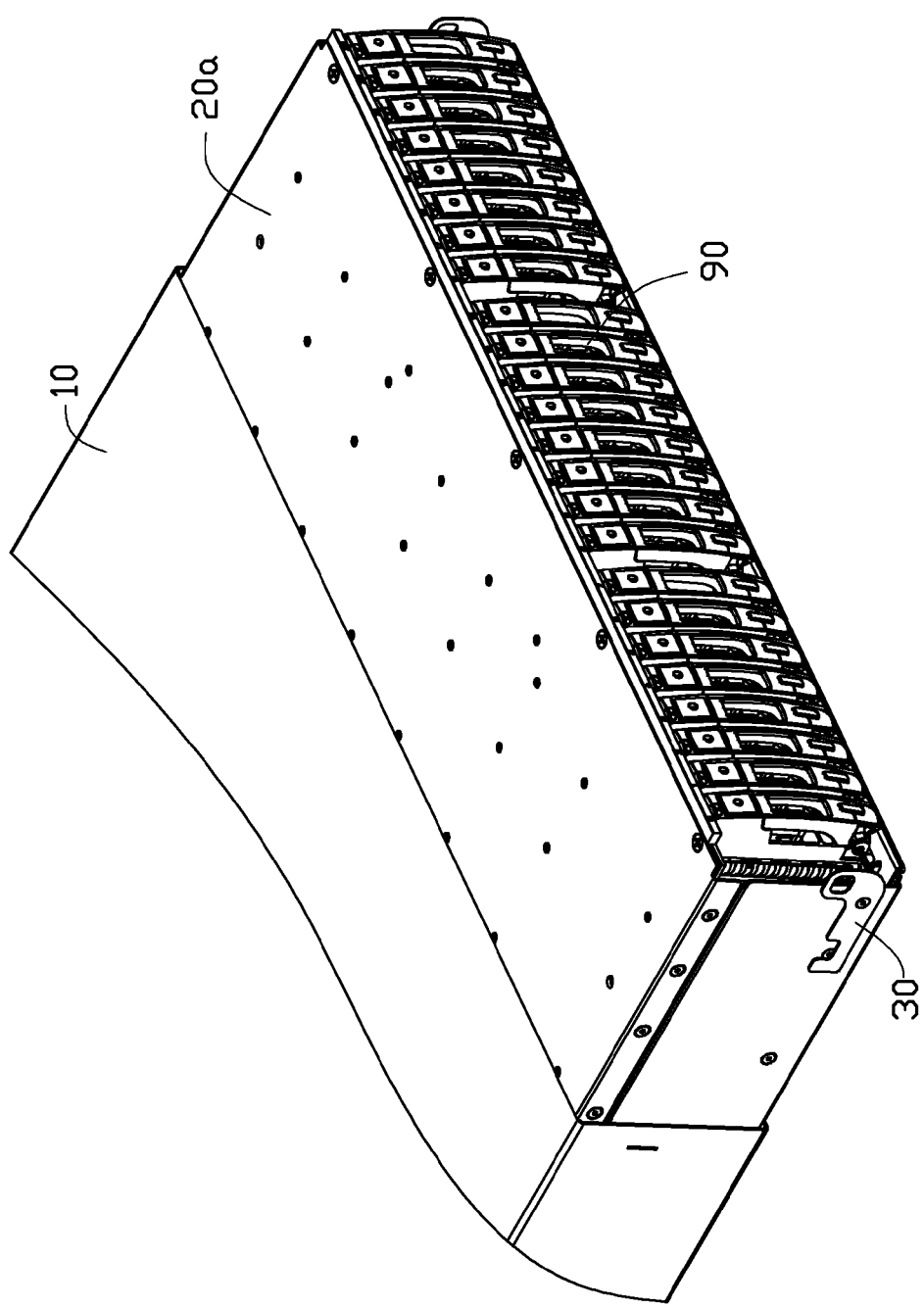
FIG. 5 is a partially assembled view of another embodiment of a mounting mechanism, together with a plurality of HDDs having small form factor.

Referring to FIG. 5, another embodiment of a mounting mechanism may include a chassis 10, a cage 20a and two latch member 30. The cage 20a are designed to accommodate a plurality of hard disk drives (HDDs) 90 with small form factor. Since the cage 20 or 20a are convenient to be mounted to or detached from the chassis 10, the chassis 10 is adapted for either LFF HDDs 80 or SFF HDDs 90.

It is believed that the present embodiments and their advantages will be understood from the foregoing description, and it will be apparent that various changes may be made thereto without departing from the spirit and scope of the description or sacrificing all of its material advantages, the examples hereinbefore described merely being exemplary embodiments.

What is claimed is:

1. A mounting mechanism comprising:
a plurality of first hard disk drives (HDDs);
a plurality of second HDDs, which are different from the first HDDs in size;
a chassis comprising opposite sidewalls;
a first cage accommodating the plurality of first HDDs, and comprising opposite first side plates;
two first latch members pivotably correspondingly attached to the first side plates of the first cage between locking positions and unlock positions;
a second cage accommodating the plurality of second HDDs, and comprising opposite second side plates; and
two second latch members pivotably correspondingly attached to the second side plates of the cage between locking positions and unlock positions;
wherein the first cage and the second cage are selectively securely received in the chassis in response to the corresponding latch members of the selected cage being pivoted to the locking positions to correspondingly engage with the sidewalls of the chassis, each of the first cage and the second cage is enabled to slide in the chassis in response to the corresponding latch members being pivoted to the unlocking positions.

2. The mounting mechanism of claim 1, wherein each of the first and second latch members is strip-shaped, and comprises a hook to engage with one of the sidewalls of the chassis, and an operating portion opposite to the hook.

3. The mounting mechanism of claim 2, wherein each of the first and second latch members defines a pivot hole in a center of the latch member, between the hook and the operating portion, each of the first and second side plates of the first and second cages defines a mounting hole, two fasteners correspondingly pivotably extend through the pivot holes of the first or second latch members and are fastened in the mounting holes of the first or second cage.

* * * * *